United States Patent
Kurtsov et al.

(10) Patent No.: US 11,677,684 B2
(45) Date of Patent: *Jun. 13, 2023

(54) SYSTEMS AND METHODS FOR NETWORK STACK

(71) Applicant: Meta Platforms Technologies, LLC, Menlo Park, CA (US)

(72) Inventors: Gleb Kurtsov, Redwood City, CA (US); Adrian Harold Chadd, Oakland, CA (US); Stanislav Sedov, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 88 days.

This patent is subject to a terminal disclaimer.

(21) Appl. No.: 17/185,429

(22) Filed: Feb. 25, 2021

(65) Prior Publication Data

US 2021/0184991 A1 Jun. 17, 2021

Related U.S. Application Data

(63) Continuation of application No. 16/681,478, filed on Nov. 12, 2019, now Pat. No. 10,972,407.

(51) Int. Cl.
*H04L 47/70* (2022.01)
*H04L 67/141* (2022.01)
(Continued)

(52) U.S. Cl.
CPC .......... *H04L 47/827* (2013.01); *H04L 67/141* (2013.01); *H04L 67/60* (2022.05); *H04L 69/16* (2013.01)

(58) Field of Classification Search
CPC ..... H04L 47/827; H04L 67/141; H04L 67/60; H04L 69/16; H04L 61/103;
(Continued)

(56) References Cited

U.S. PATENT DOCUMENTS 7,231,638 B2 * 6/2007 Blackmore ............. G06F 9/544
  711/2
8,893,222 B2 * 11/2014 Russello ................. G06F 21/53
  726/1
(Continued)

OTHER PUBLICATIONS

Michael Marty et al., Snap: a microkernel approach to host networking. In Proceedings of the 27th ACM Symposium on Operating Systems Principles (SOSP '19). Association for Computing Machinery, New York, NY, USA, 399-413. https://doi.org/10.1145/3341301.3359657 (Year: 2019).*

*Primary Examiner* — Patrice L Winder
(74) *Attorney, Agent, or Firm* — Baker Botts L.L.P.

(57) ABSTRACT

In one embodiment, a method includes starting a network-coordination service, a network-interface component, and an application as separate processes within a user space of an operating system of a device; receiving, by the network-coordination service, a request from the application to connect with a host; selecting, by the network-coordination service and in response to the request, the network-interface component to service the requested connection with the host, the network-interface component is associated with a network interface; allocating, by the network-coordination service, a shared memory region for the application and the network-interface component, the shared memory region is associated with a reference; and sending, by the network-coordination service, the reference to the application, the reference is configured to be used by the application to access the shared memory region, and the shared memory region is configured to be used by the application and the network-interface component to communicate packet data.

17 Claims, 6 Drawing Sheets

(51) Int. Cl.
*H04L 67/60* (2022.01)
*H04L 69/16* (2022.01)

(58) Field of Classification Search
CPC ........... H04L 2101/622; H04L 61/4511; H04L 63/1466; G06F 21/53
See application file for complete search history.

(56) References Cited

U.S. PATENT DOCUMENTS

| | | | |
|---|---|---|---|
| 9,438,638 B2* | 9/2016 | Raymond | H04L 67/141 |
| 10,298,681 B1* | 5/2019 | Makin | H04L 67/1097 |
| 10,305,834 B2* | 5/2019 | Ho | H04L 67/02 |
| 10,587,434 B2* | 3/2020 | Yu | H04L 69/16 |
| 10,599,494 B2* | 3/2020 | Tan | G06F 9/544 |
| 2013/0276056 A1* | 10/2013 | Epstein | G06F 9/45558 |
| | | | 726/1 |
| 2014/0280984 A1* | 9/2014 | Raymond | H04L 67/141 |
| | | | 709/227 |
| 2018/0329743 A1* | 11/2018 | Pope | G06F 9/50 |
| 2019/0306282 A1* | 10/2019 | Masputra | G06F 21/52 |

* cited by examiner

SYSTEMS AND METHODS FOR NETWORK STACK

CROSS-REFERENCE TO RELATED APPLICATIONS

This application claims priority to and is a continuation of U.S. patent application Ser. No. 16/681,478, filed Nov. 12, 2019, all of which are hereby incorporated by reference herein in their entireties.

TECHNICAL FIELD

This disclosure generally relates to computing devices, and in particular, related to a system which can provide networking services to applications.

BACKGROUND

Certain operating systems can provide networking services to applications through the network stack. In certain systems (e.g., UNIX-like systems), the network stack is a part of monolithic kernel architecture (e.g., TCP/IP stack). Although certain systems may couple applications and the user-space network stack in certain systems, the security of the systems can be compromised because the coupled application can have direct access to the system and transmit arbitrary data to the network. Such systems may maintain a large piece of data at user space and may not provide a practical way to limit services, destination addresses, and protocols of the applications

SUMMARY OF PARTICULAR EMBODIMENTS

The purpose and advantages of the disclosed subject matter will be set forth in the description that follows. Additional advantages of the disclosed subject matter will be realized and attained by the methods and systems particularly pointed out in the written description and claims, as well as from the appended drawings.

The disclosed subject matter provides systems and techniques for network stack which can address existing security, performance, and application interface concerns by isolating network components in user space and outside of the kernel. The disclosed system design includes the network stack as a set of separate services in the user space with separate control and data planes. For example, the subject matter provides an example method comprising starting a network-coordination service, a network-interface component, and an application as separate processes within a user space of an operating system of a device, receiving, by the network-coordination service, a request from the application to connect with a host, selecting, by the network-coordination service and in response to the request, the network-interface component to service the requested connection with the host, wherein the network-interface component is associated with a network interface of the device, allocating, by the network-coordination service, a shared memory region for the application and the selected network-interface component, wherein the shared memory region is associated with a reference, and sending, by the network-coordination service, the reference to the application, wherein the reference is configured to be used by the application to access the shared memory region; wherein the shared memory region is configured to be used by the application and the network-interface component to communicate packet data.

In non-limiting embodiments, the network-interface component can include a set of per-interface services and a network-interface library. The set of per-interface services can include a first service running as separate processes. The first service (e.g., ifd) can be configured to perform one or more control plane networking operations. The set of per-interface services can further include multiple separated processes. The network-interface library (e.g., ifmux) can be configured to perform one or more data plane networking operations. In some embodiments, the application can instantiate a transport protocol library associated with the operating system. The transport protocol library can be configured to use the reference to the shared memory region to communicate packet data with the network-interface component. In certain embodiments, the application can have permission to open IPC channels directly with the network-coordination service and lacks permission to open IPC channels directly with the network-interface component. The network-coordination service can have permission to open IPC channels directly with the network-interface component. The network-coordination service can be configured to manage a plurality of network-interface components, including the selected network-interface component. In non-limiting embodiments, the example method can further include accessing, by the network-coordination service, network configuration or network status data associated with the plurality of network-interface components. The selection of the network-interface component can be based on the network configuration or network status data. In some embodiments, the example method can also include verifying, by the network-coordination service and in response to the request, that the application has permission to connect with the host.

In certain embodiments, the example method can further include requesting, by the network-coordination service and in response to the request, the selected network-interface component to provide name resolution and address resolution, generating, by the network-coordination service, one or more tokens associated with the name resolution and the address resolution, sending, by the network-coordination service, the one or more tokens to the application, receiving, by the network-interface component, a packet transmission request from the application specifying the one or more tokens, and determining, by the network-interface component, a destination address for one or more packets by validating the one or more tokens.

In certain embodiments, the example method can also include receiving, by the network-interface component, a packet transmission request from the application specifying a data reference to data stored in the shared memory region, accessing, by the network-interface component, the data stored in the shared memory region using the data reference, generating, by the network-interface component, hardware descriptors and one or more packets for the data, causing, by the network-interface component, the network interface to transmit the one or more packets using the hardware descriptors, and sending, by the network-interface component, an IPC message to the application to notify the application of a status of the transmission of the one or more packets.

In certain embodiments, the example method can further include receiving, by the network-interface component and from the application, an address within the shared memory region for storing incoming packets, causing, by the network-interface component, an incoming packet for the application to be stored in the shared memory region according to the address based on a token associated with the address, and sending, by the network-interface component, a message to the application to notify the application that the incoming packet is available in the shared memory region.

In certain embodiments, the disclosed subject matter provides a system comprising one or more processors and one or more computer-readable non-transitory storage media coupled to one or more of the processors and comprising instructions operable when executed by one or more of the processors to cause the system to start a network-coordination service, a network-interface component, and an application as separate processes within a user space of an operating system of a device, receive, by the network-coordination service, a request from the application to connect with a host, select, by the network-coordination service and in response to the request, the network-interface component to service the requested connection with the host, wherein the network-interface component is associated with a network interface of the device, allocate, by the network-coordination service, a shared memory region for the application and the selected network-interface component, wherein the shared memory region is associated with a reference, and send, by the network-coordination service, the reference to the application, wherein the reference is configured to be used by the application to access the shared memory region, wherein the shared memory region is configured to be used by the application and the network-interface component to communicate packet data. In non-limiting embodiments, the application can have permission to open IPC channels directly with the network-coordination service and lacks permission to open IPC channels directly with the network-interface component. The network-coordination service can have permission to open IPC channels directly with the network-interface component.

In certain embodiments, the disclosed system is further configured to request, by the network-coordination service and in response to the request, the selected network-interface component to provide name resolution and address resolution, generate, by the network-coordination service, one or more tokens associated with the name resolution and the address resolution, send, by the network-coordination service, the one or more tokens to the application, receive, by the network-interface component, a packet transmission request from the application specifying the one or more tokens, and determine, by the network-interface component, a destination address for one or more packets by validating the one or more tokens.

In certain embodiments, the disclosed system is also configured to receive, by the network-interface component, a packet transmission request from the application specifying a data reference to data stored in the shared memory region, access, by the network-interface component, the data stored in the shared memory region using the data reference, generate, by the network-interface component, hardware descriptors and one or more packets for the data, and cause, by the network-interface component, the network interface to transmit the one or more packets using the hardware descriptor.

In certain embodiments, the disclosed system is further configured to receive, by the network-interface component and from the application, an address within the shared memory region for storing incoming packets, cause, by the network-interface component, an incoming packet for the application to be stored in the shared memory region according to the address based on a token associated with the address, and send, by the network-interface component, a message to the application to notify the application that the incoming packet is available in the shared memory region.

In certain embodiments, the disclosed subject matter provides one or more computer-readable non-transitory storage media embodying software that is operable when executed to start a network-coordination service, a network-interface component, and an application as separate processes within a user space of an operating system of a device, receive, by the network-coordination service, a request from the application to connect with a host, select, by the network-coordination service and in response to the request, the network-interface component to service the requested connection with the host, wherein the network-interface component is associated with a network interface of the device, allocate, by the network-coordination service, a shared memory region for the application and the selected network-interface component, wherein the shared memory region is associated with a reference, and send, by the network-coordination service, the reference to the application, wherein the reference is configured to be used by the application to access the shared memory region, wherein the shared memory region is configured to be used by the application and the network-interface component to communicate packet data. In non-limiting embodiments, the application can have permission to open IPC channels directly with the network-coordination service and lacks permission to open IPC channels directly with the network-interface component. The network-coordination service can have permission to open IPC channels directly with the network-interface component.

In certain embodiments, the disclosed media is further configured to request, by the network-coordination service and in response to the request, the selected network-interface component to provide name resolution and address resolution, generate, by the network-coordination service, one or more tokens associated with the name resolution and the address resolution, send, by the network-coordination service, the one or more tokens to the application, receive, by the network-interface component, a packet transmission request from the application specifying the one or more tokens, and determine, by the network-interface component, a destination address for one or more packets by validating the one or more tokens.

In certain embodiments, the disclosed media is also configured to receive, by the network-interface component, a packet transmission request from the application specifying a data reference to data stored in the shared memory region, access, by the network-interface component, the data stored in the shared memory region using the data reference, generate, by the network-interface component, hardware descriptors and one or more packets for the data, and cause, by the network-interface component, the network interface to transmit the one or more packets using the hardware descriptor.

In certain embodiments, the disclosed media is further configured to receive, by the network-interface component and from the application, an address within the shared memory region for storing incoming packets, cause, by the network-interface component, an incoming packet for the application to be stored in the shared memory region according to the address based on a token associated with the address, and send, by the network-interface component, a message to the application to notify the application that the incoming packet is available in the shared memory region.

DESCRIPTION OF EXAMPLE EMBODIMENTS

Certain operating systems can provide networking services to applications via network stack. The network stack can refer to an implementation of a computer networking protocol family. In certain systems (e.g., UNIX-like systems), network stack can be a part of the monolithic kernel. In certain systems, applications can use network hardware directly and implement transport protocols in userspace instead of using services provided by the kernel. Both kernel and user-space network stacks may have a monolithic design, and seamless integration with operating system network stack is rarely a goal of the user-space implementations resulting in overlapping functionality.

Certain systems can provide specialized APIs and tight coupling between application and user-space network stack to improve performance. However, such performance goals may be achieved by sacrificing security. In such cases, the application has either direct access to hardware or can transmit arbitrary data to the network. Although certain devices can provide hardware offloading features (e.g., offloading TCP/IP processing), the available offloading capabilities cannot be fully utilized in general-purpose systems due to the general nature of operating system kernels. A TCP/IP stack implemented as a part of a monolithic kernel presents a high-security risk because it is responsible for handling arbitrary data received over the network. Moving the network stack as a whole into a single user process is insufficient to resolve security concerns.

The disclosed subject matter provides a network stack design which can address existing security, performance, and application interface concerns by isolating network components in user space and outside of the kernel. For example, the disclosed subject matter can provide techniques for isolation of the network components, improved application interface, policy-based multipath support, auto-configuration of the network stack, zero-copy networking, and reduced overhead of systems.

Figure 1:
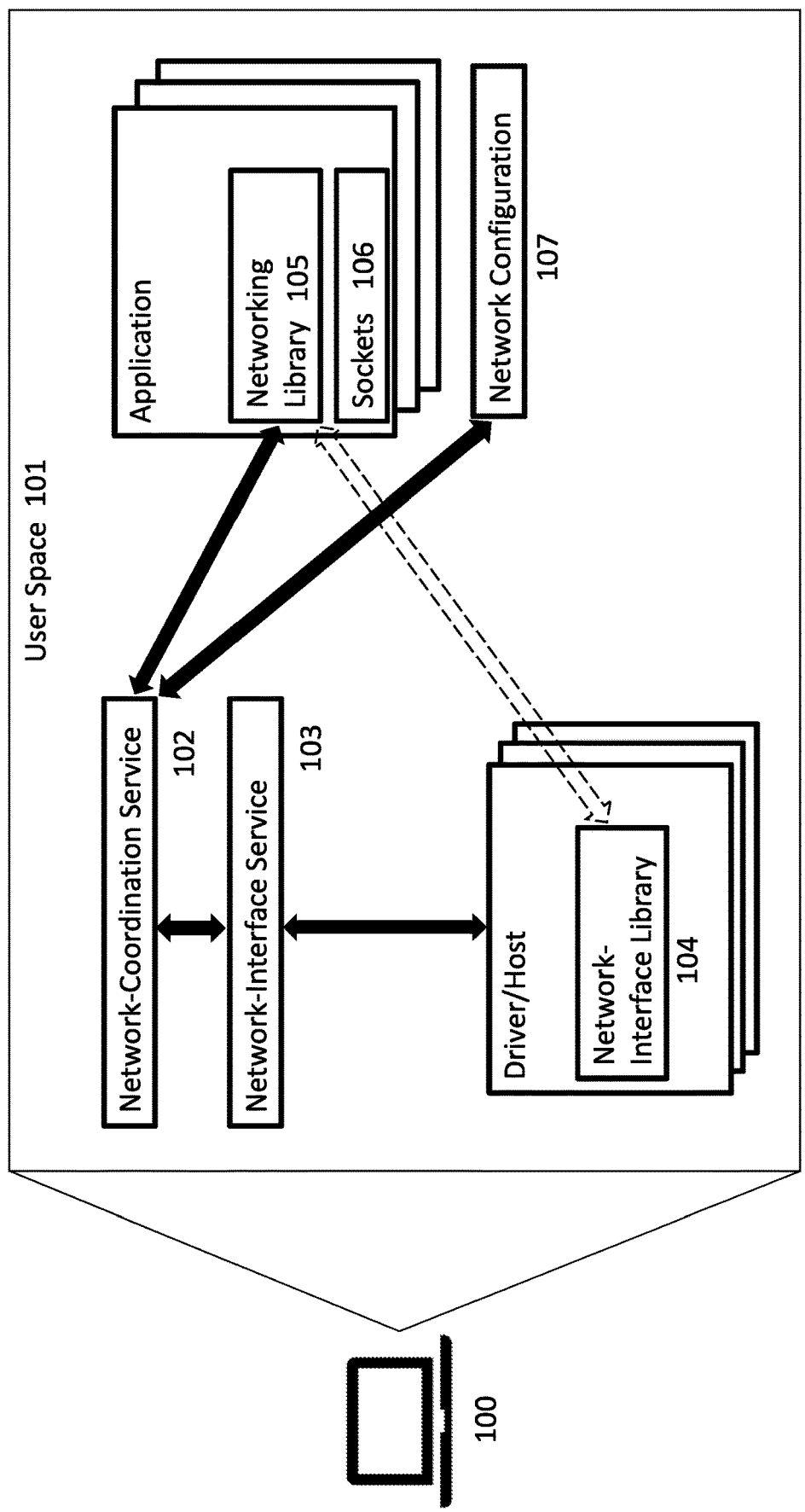
FIG. 1 illustrates an example system for the network stack.

FIG. 1 illustrates an example system 100 associated with the network stack as a set of separate services in the user spaces 101. The disclosed system can include a network-coordination service 102, a first network-interface component 103, a second network-interface library 104, a networking library 105, sockets 106, and network configurations 107.

In certain embodiments, the disclosed system can include applib as a networking library 105. Applications can use the applib to communicate with other network services. The applib can control transport protocols and sessions. The networking library service can support various protocols. For example, the applib can provide, among other protocols, transports for stream (TCP), Datagram (UDP), and Messages (SCTP and QUIC). To communicate with the host, the applib can establish an inter-process communication (IPC) channel to a coordination service and send a request to connect to the host and port. The applib can be a library that can be instantiated by each application. Having the transport layer be part of the application domain can provide various effects to the disclosed system. For example, in a microkernel architecture, each IPC communication can be expensive, so having the transport layer be instantiated as part of an application can reduce the need for an IPC communication between the application and the transport layer. Furthermore, if the transport layer is compromised, security risks can be restricted to the confines of that application, rather than to the entire layer if it were implemented as a service.

In non-limiting embodiments, the disclosed networking library 105 can provide various features. For example, the applib can provide complete L5 transport protocol implementation (e.g., TCP and UDP), Transparent connect (e.g., applib can manage name resolution, transport protocols, sessions, etc.), Transparent encryption, Multipath support, high flexibility, extensive configuration options, zero-copy receive and zero-copy transmit. In some embodiments, the disclosed networking library can provide various transports such as stream (TCP), datagram (UDP), and messages (SCTP, QUIC—unordered messages, arbitrary size, guaranteed delivery, congestion control).

In certain embodiments, the disclosed system can include various network interface services and libraries. For example, the disclosed system can include an ifmux library and an ifd service. The ifmux and ifd can operate within the scope of a single network interface and may not have access to other interfaces in the system. ifmux can translate IPC messages into hardware descriptors for receiving and transmitting packets using a muxer/demuxer component. The mixer/demuxer component can determine which flow (i.e., endpoint of a network interface) a received packet belongs to and route the packet to the right destination. Once the data path channel (e.g., IO channel is established, the ifmux and applib can directly communicate through the channel for IPC messages. Each channel can represent a different flow. The applib can submit requests specifying unused shared memory buffer. The ifmux can use the provided memory buffer to send hardware descriptors to the application. Application IPC messages received by ifmux can contain all the information necessary for constructing packets.

In non-limiting embodiments, the ifd can perform internet control message protocols, address resolution protocols (e.g., ARP, NDP), routing changes, automatic configuration (e.g., DHCP), fragmented packet reassembly, and duplicate address detection. After successful initialization of svc and ifd, data path channels can be forwarded to the applib. The applib can send a packet (e.g., IPC messages) through the channel to the ifmux. In certain embodiments, the ifd can implement a control plane of the network interface layer. For example, the ifd can implement ICMP, L2 address resolution protocols (e.g., ARP, NDP), auto-configuration (e.g., DHCP), duplicated address detection, non-application traffic, fragmented packet reassembly, service discovery, and DNS/mDNS resolver In certain embodiments, processing by Network Interface Service can return packet back into the muxer/demuxer component. For example, results of fragment reassembly can be forwarded back to the ifmux. The disclosed system does not allow arbitrary packet injection ("return"). For example, an application cannot inject packets into the muxer. Other components of ifd also cannot inject packets back into muxer. The return is only allowed in specific cases (e.g., fragment reassembly cases). In some embodiments, the ifmux can handle an arbitrary number of flows (subject to hardware support). The flows can be limited by hardware resources by configuring the flows to use dedicated hardware resources. In certain embodiments, any internal services can be isolated to reduce trusted computer base, lower attack surface, and improve the security of the disclosed system. For example, fragmented packet reassembly, DHCP, DNS, Bonjour, or combinations thereof can be isolated for becoming a separate process.

In certain embodiments, the disclosed system can include a coordination service 102. For example, the disclosed system can include svc as a coordination service. svc can coordinate communication between applib and ifd. When applications send the request to connect to the host and port, the svc verifies whether the application has appropriate permissions. Applications cannot open a direct channel to the network interface layer (e.g., ifmux and ifd). Once the permissions are confirmed, the svc can establish an IPC channel on behalf of the application to the ifmux. Applib can communicate directly with ifmux In non-limiting embodiments, applib does not communicate directly to ifd services. A coordinator can receive requests from applib and send other requests to ifd. Then, the coordinator can receive responses from ifd and send responses to applib. Interfaces between applib-svc and ifd-svc can be different. For example, there can be more than 1:1 mapping between requests and responses.

In non-limiting embodiments, the disclosed svc can manage all network interfaces and react to changes in network configuration. As a coordinator service, the disclosed svc can check permissions for the application request and prepares the IPC channel to auxiliary services on behalf of the application. In non-limiting embodiments, the IPC channel forwarding and capabilities can be used to ensure that the application gets minimal permissions necessary. Applications do not have permission to open IPC channel directly to the network interface layer (e.g., ifmux or ifd). For example, the disclosed applib can issue IPC message to the svc to resolve a domain name. An application can specify additional parameters (e.g., authoritative DNSSEC response or DNS entry type). The svc can select ifd to forward the request. Response from the ifd can checked by svc and forwarded back to the application afterward. In some embodiments, the disclosed coordination service can include access to ifd internal state. For example, svc can have access to routing and DNS configuration state of ifd, which cannot be accessible by applications without the coordination service.

In non-limiting embodiments, management utilities (e.g., ifconfig and netstat) can use IPC to connect to the svc.

In particular embodiments, methods 200, 300, 400, and 500 may be performed by the system 100.

Figure 2:
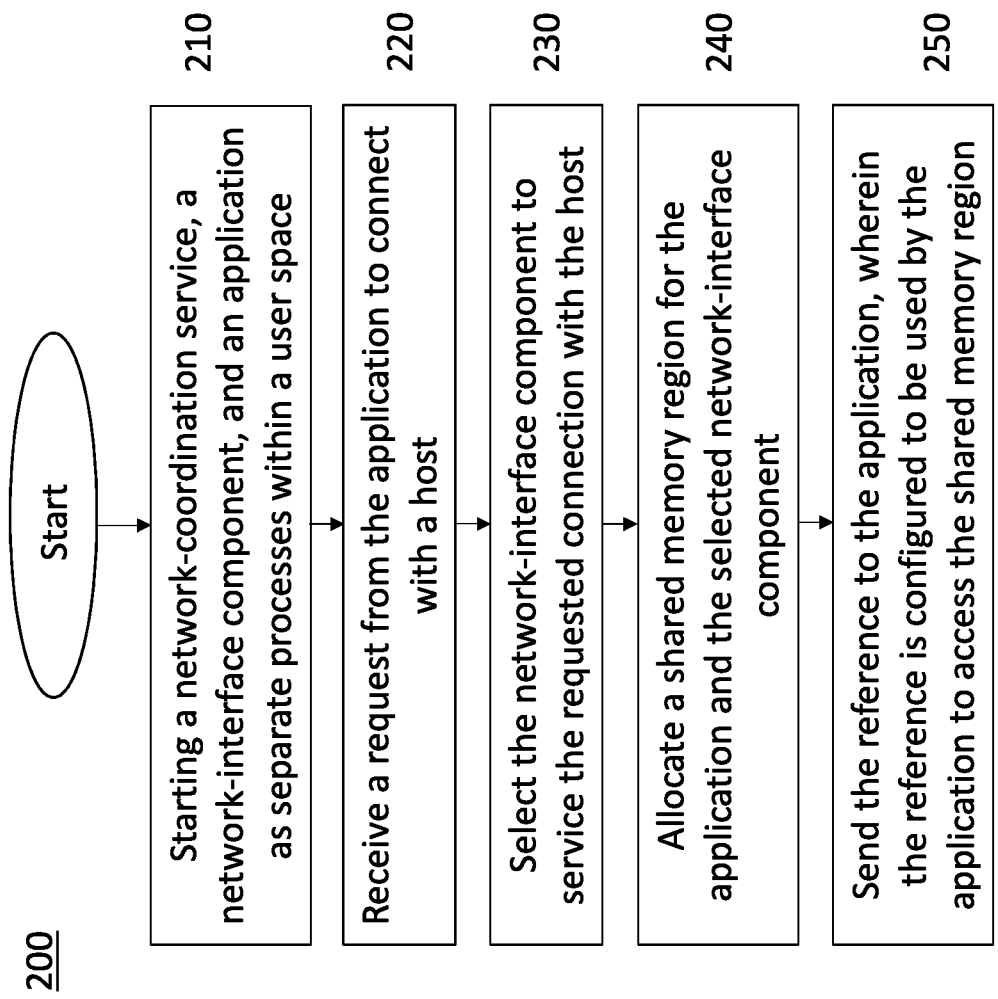
FIG. 2 illustrates an example method for the network stack.

FIG. 2 illustrates a flow diagram according to certain embodiments. In particular, FIG. 2 illustrates an example method 200 for opening a connection. The method may begin at step 210, where a system executing on a computing device can start a network-coordination service, a network-interface component, and an application as separate processes within userspace. Each service can be isolated within a user space providing improved security. For example, certain network stack designs can maintain the entire network stack and flow state in a single isolation domain (e.g., kernel). Such network stacks can be large and complex systems and thus, can be difficult to protect against attacks (e.g., processing untrusted inputs). Such vulnerability of the layer can allow the attacker gaining an ability to monitor the entire network traffic of the device leading to remote code execution in the kernel mode. The disclosed system can include a network stack design which can improve the security of the system by running the network stack outside of the kernel. Thus, potential attacks to the network stack layer cannot lead to kernel memory disclosure or privileged code execution. Furthermore, by splitting the network stack into multiple parts (e.g., svc, ifd, ifmux, etc.), having TCP/IP flow logic run within the protection domain of an application, the disclosed system can reduce the risk of external attacks, as such attacks to a particular application in the upper levels of the network stack cannot affect any other applications running in the system. The ifd can be further split into multiple processes/services. The isolated processes and services (e.g., fragment reassembly service) can increase security without decreasing the performance level. In non-limiting embodiments, the disclosed system can reduce the surface of the system which can be exposed to such attacks by reducing the size of the network stack that can be shared between applications. For example, each application can be isolated. Accordingly, the compromise of an application does not lead to the compromise of the network stack or other network applications. In some embodiments, other components of network stack can be isolated. For example, a driver can be isolated preventing other compromises of network stack components and applications. The isolated components can provide improved security and avoid high profile attacks.

In certain embodiments, the disclosed system can include svc as a coordination service. The coordination service can coordinate communication between services. In particular, svc can manage multiple services. For example, the network-coordination service can be configured to manage a plurality of network-interface components, including the selected network-interface component.

In certain embodiments, the disclosed system can include multiple network-interface components. For example, the network-interface component can include a first network-interface service and a first network-interface library. The first network-interface service can be configured to perform one or more control plane networking operations. The first network-interface library can be configured to perform one or more data plane networking operations. The disclosed system can include ifd as the first network-interface service and ifmux as the first network-interface library.

In certain embodiments, the disclosed application can instantiate a transport protocol library associated with the system. The transport protocol library (e.g., applib) can be configured to use a reference to the shared memory region to communicate packet data with the network-interface component. In non-limiting embodiments, by requiring applications to go through the coordination service, the disclosed system can avoid giving applications the permissions to access the network-interface components. For example. the application (e.g., applib) can have permission to open IPC channels directly with the network-coordination service (e.g., svc), but cannot have permission to open IPC channels directly with the network-interface component (e.g., ifd and ifmux). The network-coordination service (e.g., svc) can have permission to open IPC channels directly with the network-interface component (e.g., ifd and ifmux).

At step 220, the system can receive a request from the application to connect to a host through the network-coordination service. For example, the system can receive a request to connect with a host through an IPC channel from the application via the svc. The disclosed system can also verify that the application has permission to connect with the host through the network-coordination service in response to the request.

At step 230, the system can select the network-interface component to service the requested connection with the host through the network-coordination service in response to the request. In non-limiting embodiments, the network-interface component can be associated with a network interface of a device. For example, the network-interface component (e.g., ifd and ifmux) can be associated with a network interface controller card. The disclosed system can further access network configuration or network status data associated with the plurality of network-interface component through the network-coordination service. In non-limiting embodiments, the network-coordination service can select the network-interface component (e.g., path/interface to use for connection) based on the network configuration or network status data.

At step 240, the system can allocate a shared memory region for the application and the selected network-interface component through the network-coordination service. In a non-limiting embodiment, the shared memory region can be associated with a reference. The reference can be a handle or a reference to a system resource. The reference can be transferred to another process (e.g., from svc to applib or ifmux). In some embodiments, the shared memory region can be a part of IO channels or data path channels.

At step 250, the system can send the reference to the application through the network-coordination service. The reference can be configured to be used by the application to access the shared memory region. In non-limiting embodiments, the shared memory region can be configured to be used by the application and the network-interface component to communicate packet data. The shared memory region can allow separate processes (e.g., application and ifmux) to communicate data without the need to use IPC messages. Each can store data in the shared memory, and the other can directly read from memory. For example, to manage IPC calls, during setup, two parties can set up a shared memory region (e.g., their virtual memory space both map to the same physical memory). In doing so, when one party writes to the shared memory, the other will automatically have it available without needing an IPC call. By setting up this common memory region, we can achieve zero-copy networking. An IPC call may require the kernel to get involved, switch user contexts, and copy the data being sent from the transmitter's memory to the receiver's memory leading to an expensive process.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for network stack including the particular steps of the method of FIG. 2, this disclosure contemplates any suitable method for network stack including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
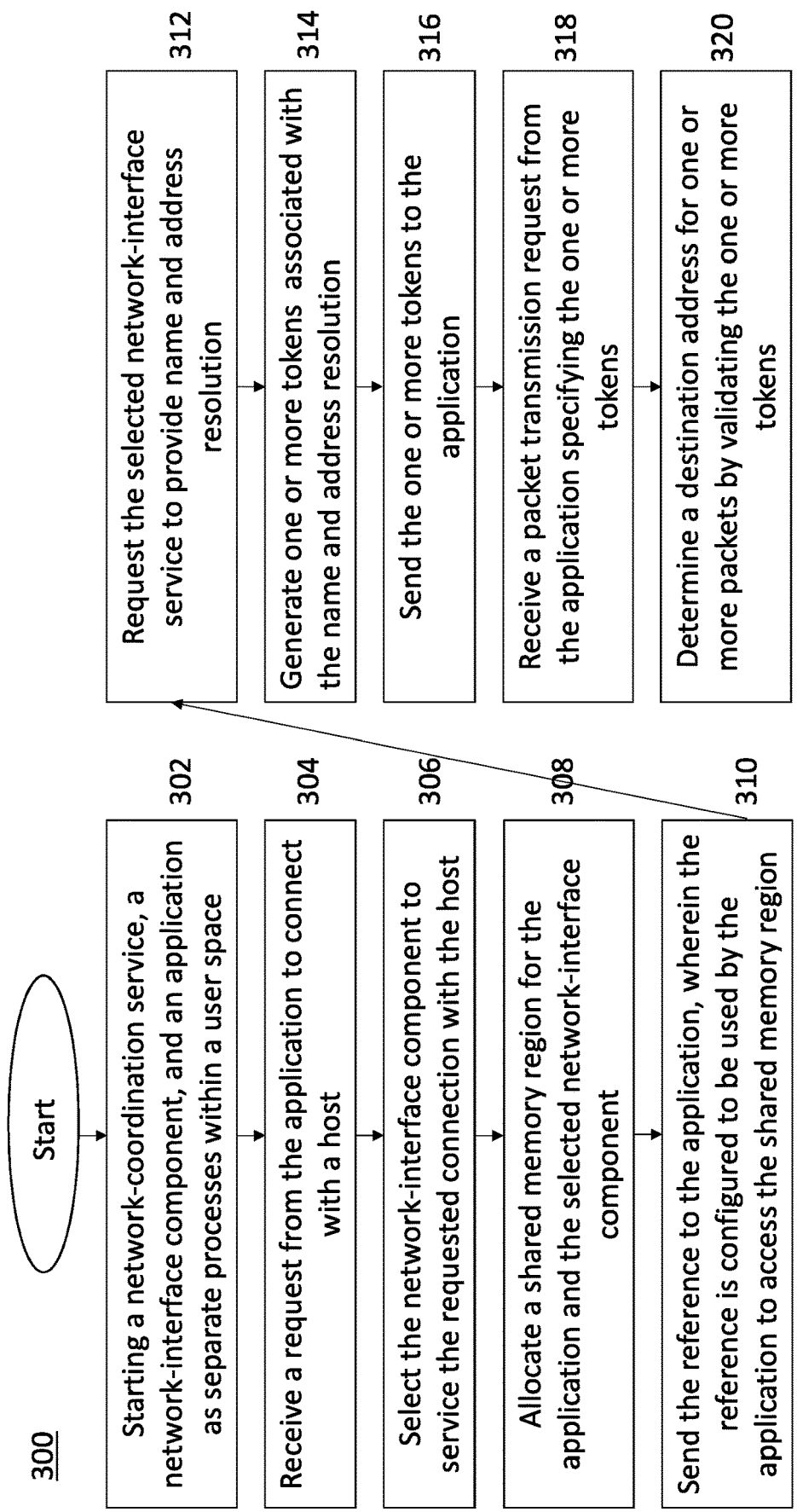
FIG. 3 illustrates an example method for opening a connection.

The disclosed system can further perform additional steps for opening a connection. FIG. 3 illustrates an example method 300 for opening connection. The example illustrated in FIG. 3 can be a continuation of the example illustrated in FIG. 2. As an example and not by way of limitation, a system executing on a computing device can start a network-coordination service, a network-interface component, and an application as separate processes within a user space at step 302. At step 304, the system can receive a request from the application to connect with a host through the network-coordination service. At step 306, the system can select the network-interface component to service the requested connection with the host through the network-coordination service in response to the request. At step 308, the system can allocate a shared memory region for the application and the selected network-interface component through the network-coordination service. At step 310, the system can send the reference to the application through the network-coordination service.

In certain embodiments, the disclosed system can further request the selected network-interface component to provide name resolution (e.g., domain name resolution) through the network-coordination service in response to the request 312. For example, svc can initiate a DNS name lookup through DNS resolver associated with the interface.

In certain embodiments, the disclosed system can further generate one or more tokens associated with the name resolution and the address resolution (e.g., MAC address) through the network-coordination service 314. In non-limiting embodiments, after successful domain name resolution, peer MAC address can be resolved through ifd. Although name and MAC address resolution can be performed by the ifd, such operations are independent operations. The svc can choose protocols to use (e.g., IPv4 vs IPv6) based on configuration and application preference.

In certain embodiments, the disclosed system can further send the one or more tokens to the application through the network-coordination service 316. In non-limiting embodiments, the svc can create or reuse a flow and then associate the name resolution tokens with that flow. The result of a name and address resolution operation can be a token. These tokens can be accessible by the ifmux and applib. In non-limiting embodiments, a token's value can be changed exclusively by the svc. The applib can use provided tokens to specify destination addresses when communicating to the ifmux. Usage of tokens instead of specifying the actual addresses can ensure that the destination address is not spoofed by an application.

In certain embodiments, the disclosed system can further receive a packet transmission request from the application specifying the one or more tokens through the network-interface component 318.

In certain embodiments, the disclosed system can further determine a destination address for one or more packets based on the one or more tokens through the network-interface component 320. The one or more tokens can be used as an access control mechanism. For example, applib can set a destination address and ifmux can perform a security check to confirm whether the destination address matches the one or more tokens. In non-limiting embodiments, ifmux can update the header based on the one or more tokens.

In certain embodiments, the disclosed coordination service can produce a token which is accessible by ifd, ifmux and applib. Each component can use a different token. For example, a token used for applib-svc connection can be invalid for connection between applib-ifd. Only coordination service, as a trusted resource of network stack, can change the value of the token and handle the permission of processes/service accesses. The applib can specify destination addresses only using the provided token. Contrary to the usage of actual addresses (e.g., source address or destination address), the token can protect from address spoofing by applications (e.g., malicious applications).

Figure 4:
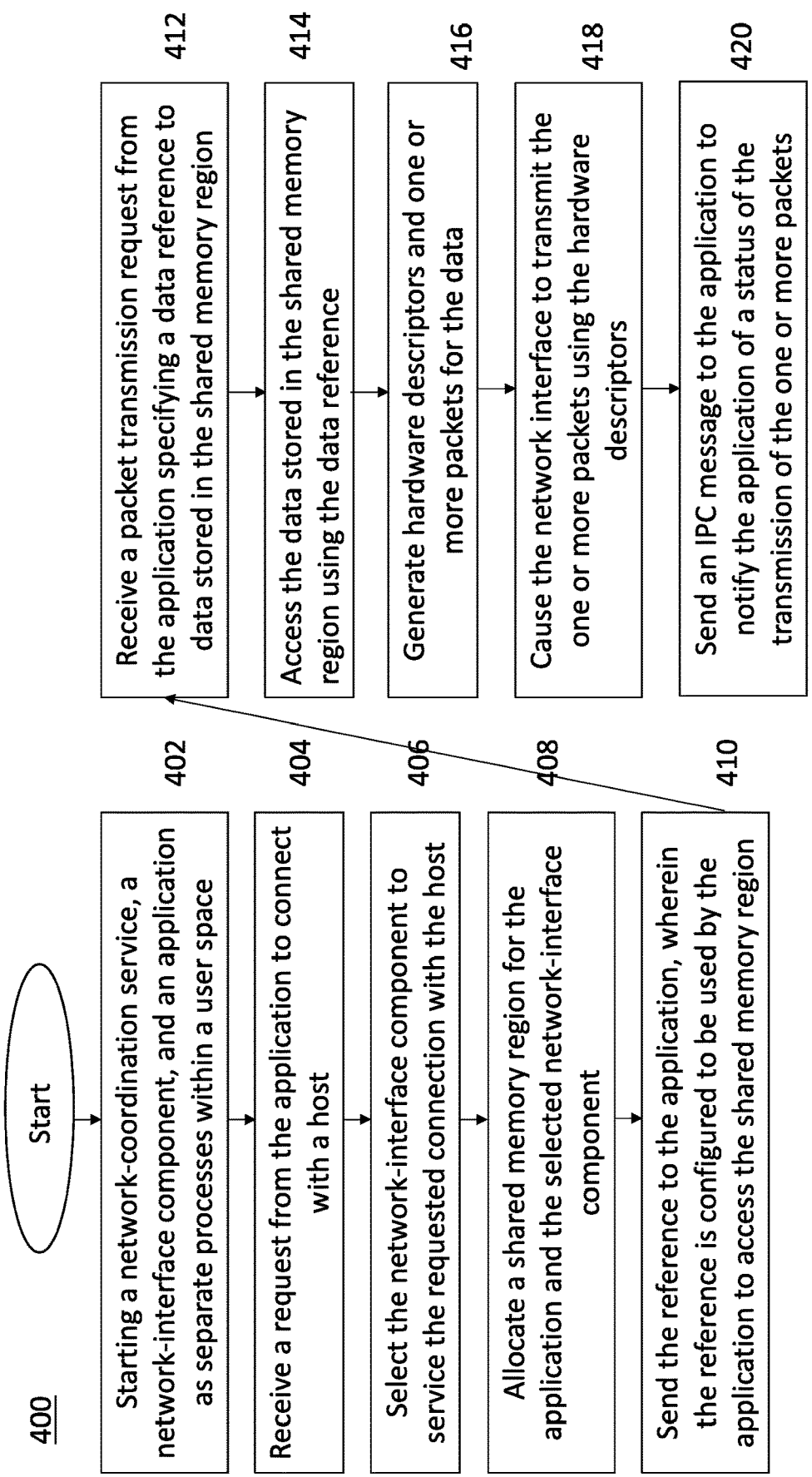
FIG. 4 illustrates an example method for transmitting packets.

The disclosed system can further perform additional steps for transmitting packets. FIG. 4 illustrates an example method 400 for transmitting packets. The example illustrated in FIG. 4 can be a continuation of the example illustrated in FIGS. 2 and 3. As an example and not by way of limitation, a system executing on a computing device can start a network-coordination service, a network-interface component, and an application as separate processes within a user space at step 402. At step 404, the system can receive a request from the application to connect with a host through the network-coordination service. At step 406, the system can select the network-interface component to service the requested connection with the host through the network-coordination service in response to the request. At step 408, the system can allocate a shared memory region for the application and the selected network-interface component through the network-coordination service. At step 410, the system can send the reference to the application through the network-coordination service.

In certain embodiments, the disclosed system can further receive a packet transmission request from the application specifying a data reference to data stored in the shared memory region through the network-interface component 412. For transmit operation, applications can put payload into a shared memory buffer. In non-limiting embodiments, the disclosed system can further access the data stored in the shared memory region using the data reference through the network-interface component.

In certain embodiments, the disclosed system can further generate hardware descriptors and one or more packets for the data through the network-interface component 414. The applib can prepare a network layer (L3, e.g., IP) and submit IPC messages with references to packet data and connection tokens to the ifmux. In non-limiting embodiments, the applib can also prepare a transport layer (L4, e.g., TCP, UDP) protocol headers.

In certain embodiments, the disclosed system can further cause the network interface to transmit the one or more packets using the hardware descriptors through the network-interface component 416. For example, the ifmux can prepend protocol headers (e.g., Ethernet header). Applib can prepend IP headers (e.g., L3). The IP headers can be validated to match a token. Multiple headers (e.g., VLAN, Ethernet header, etc.) can be prepended. The ifmux then can prepare hardware descriptors and initiate transmission operation in hardware.

In certain embodiments, the disclosed system can further send an IPC message to the application to notify the application of a status of the transmission of the one or more packets through the network-interface component 418. For example, once the transmit is completed or failed by hardware, the ifmux can send an IPC message to notify the applib regarding the status of transmission.

The disclosed systems and techniques can provide zero-copy capability even with limited hardware offloading support 420. Shared memory buffers can be abstracted by data path channels. Hardware can have access to packet payload prepared by applib in shared memory. The hardware can be programmed to use packet payload directly from the shared memory without copying the packet payload. In non-limiting embodiments, the disclosed systems and techniques can provide fairness between multiple applications at the ifmux and hardware layers. For example, ifmux can support a set of quality of service (QoS) capability such as prioritizing flows, service level guarantees (e.g., low latency and background), fairness guarantees, and bandwidth limiting. Hardware QoS also can add another layer between multiple applications.

Figure 5:
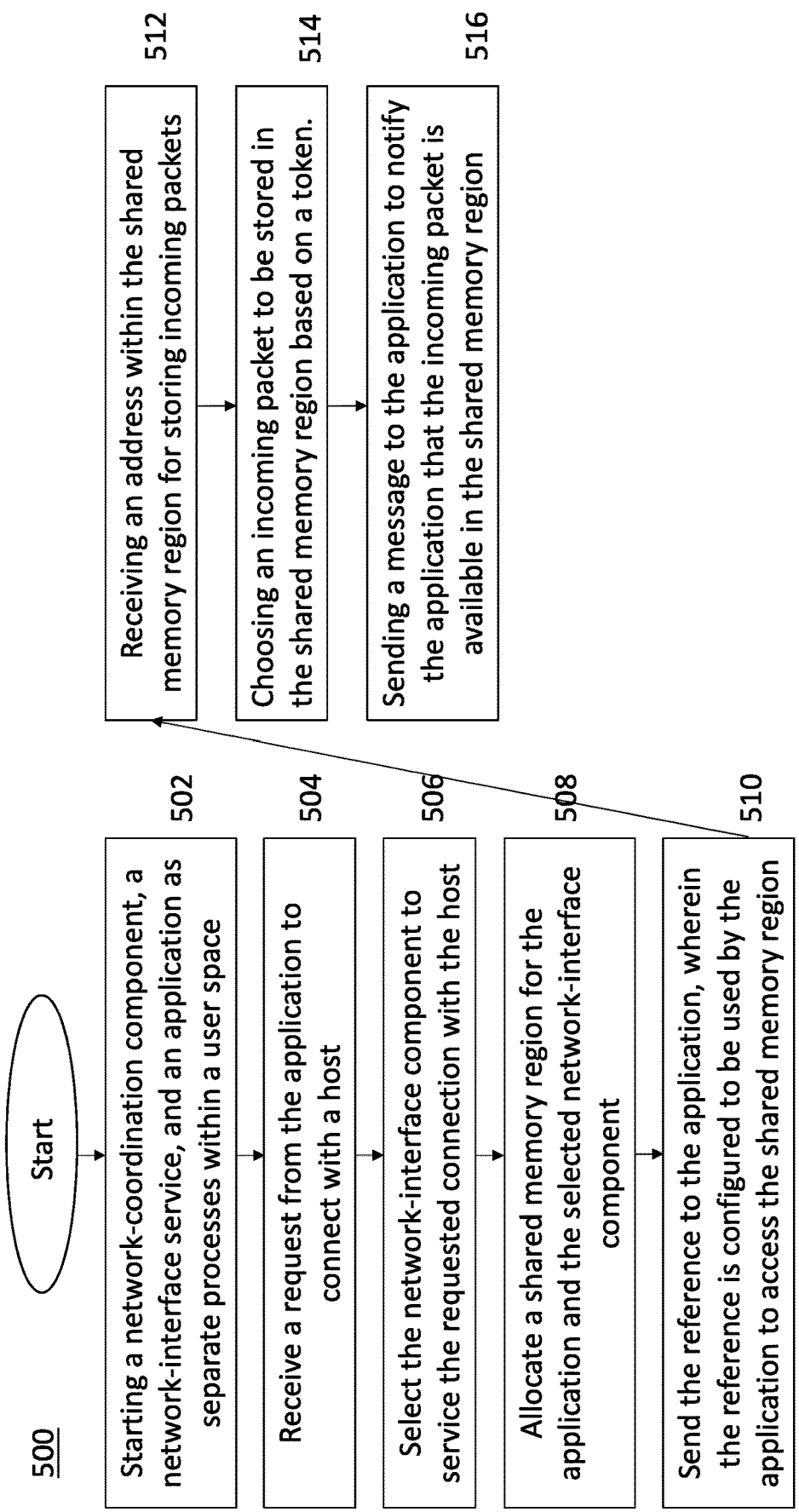
FIG. 5 illustrates an example method for receiving packets.

The disclosed system can further perform additional steps for receiving packets. FIG. 5 illustrates an example method 500 for receiving packets. The example illustrated in FIG. 5 can be a continuation of the example illustrated in FIGS. 2, 3, and 4. As an example and not by way of limitation, a system executing on a computing device can start a network-coordination service, a network-interface component, and an application as separate processes within a user space at step 502. At step 504, the system can receive a request from the application to connect with a host through the network-coordination service. At step 506, the system can select the network-interface component to service the requested connection with the host through the network-coordination service in response to the request. At step 508, the system can allocate a shared memory region for the application and the selected network-interface component through the network-coordination service. At step 510, the system can send the reference to the application through the network-coordination service.

In certain embodiments, the disclosed system can further receive an address within the shared memory region for storing incoming packets from the application via the network-interface component 512. For example, the applib and ifmux can use the IO channel corresponding to the flow. The applib can have a shared memory region used for packet buffers and submit IPC requests specifying unused shared memory buffers for receiving packets through the IO channel.

In certain embodiments, the disclosed system can further cause an incoming packet for the application to be stored in the shared memory region according to the address using the network-interface component 514. For example, the ifmux can use memory buffers provided by the application to submit hardware descriptors to the RX ring. The ifmux can choose a shared memory region to store packets. The ifmux can use a token to make a decision which application/service packet and corresponding shared memory region packet belong to. For example, the token can include metadata associated with traffic (i.e., the token can identify connection or group of connections). The source and destination address of the received packet can be used to look up a token in ifmux. The token can be then validated to ensure access has not been revoked by svc. Ifmux can maintain the generated map between tokens with/without packet addresses and application channels (e.g., shared memory region).

Although certain devices can support offloading features, the ifmux can allocate memory buffers for received packets, make a decision which flow packet belongs to, and copy packet data to the buffer provided by application. The hardware offloading capabilities can be used to implement a zero-copy receive. In non-limiting embodiments, the disclosed system can be operated without using hardware offloading. The ifmux can allocate memory and make a decision in which flow packet belongs to and copy pocket data (no zero-copy). In case of no hardware offloading support available, ifmux can copy the packet to the corresponding shared memory region. If hardware offloading support is available, hardware NIC can put the packet into the expected shared memory region and eliminate the copy.

In certain embodiments, the disclosed system can further send a message to the application to notify the application that the incoming packet is available in the shared memory region through the network-interface component. 516 Upon packet arrival, the ifmux can prepare and send a response to the IO channel. In non-limiting embodiments, the applib can perform protocol checks and operations with the packet (e.g., IP, TCP).

The disclosed system and techniques can provide firewalls. Firewall rules can be enforced independently for each flow by the ifmux. Application-level firewall can be handled by the application network stack library. In certain embodiments, the ifmux can apply filter and copy matching packets to traffic monitoring utilities. The disclosed system can allow unprivileged network monitoring and tracing by having the applib library which can provide generic access to the network flow information. For example, a version of "tcpdump" cannot have any access to the driver or svc. The tcpdump can access flows of a particular application if the application grants a particular capability to access these flows. Unlike certain systems that allow superusers to get access to the entirety of network data while unprivileged users cannot access to the flows their own applications generate, the disclosed system and techniques can provide unprivileged network monitoring and tracing with improved security.

In certain embodiments, the disclosed systems and techniques can utilize hardware offloading features. For example, the hardware offloading features can include multiple RX and TX queues, RSS or equivalent filtering capability, scatter-gather list, no 32-bit address limitation by DMA, no alignment limitation by DMA, HW timestamping, RX header splitting support or combinations thereof.

In certain embodiments, the disclosed systems and techniques can allow applications to request multiple flows and run TCP/IP network stacks independently for each flow. For example, the disclosed network stack services can use flow as the building block to provide multipath support, zero-copy data transfers, and isolation of processes. Each flow can represent the local endpoint of a network interface. When hardware can provide sufficient offloading capabilities, each flow can be backed by a hardware RX/TX queue pair. Receive-side scaling (RSS) or similar filtering capabilities can be used to map incoming packets to a specific flow. Applications looking to utilize hardware resources maximally can have the option of using multiple flows.

In the disclosed systems, the flow can serve as an underlying mechanism for policy-based path selection. For example, an application can choose between low power/low bandwidth and higher power/high bandwidth paths, require the connection to be made through a VPN tunnel, connect to devices on the local subnet, etc. In certain embodiments, the disclosed system does require default routes and global name resolution service configuration. The tunnel interface can either be configured as a default path in the svc or application can request VPN path. In non-limiting embodiments, the disclosed systems and techniques can allow applications to choose a path with reduced power consumption. For example, per-application power-management schemes can be applied, as flow state can be maintained by applications themselves.

In certain embodiments, application interfaces in the applib may not require the use of flows. The API can be connection-oriented. Multiple connections can utilize a single flow. At the same time, a multipath TCP connection can be backed by several flows.

In non-limiting embodiments, each flow can represent an isolated security context. The compromise of a process associated with the flow cannot lead to the compromise of the entire network stack. This can be achieved by the applib executing code with a large attack surface in application context.

Figure 6:
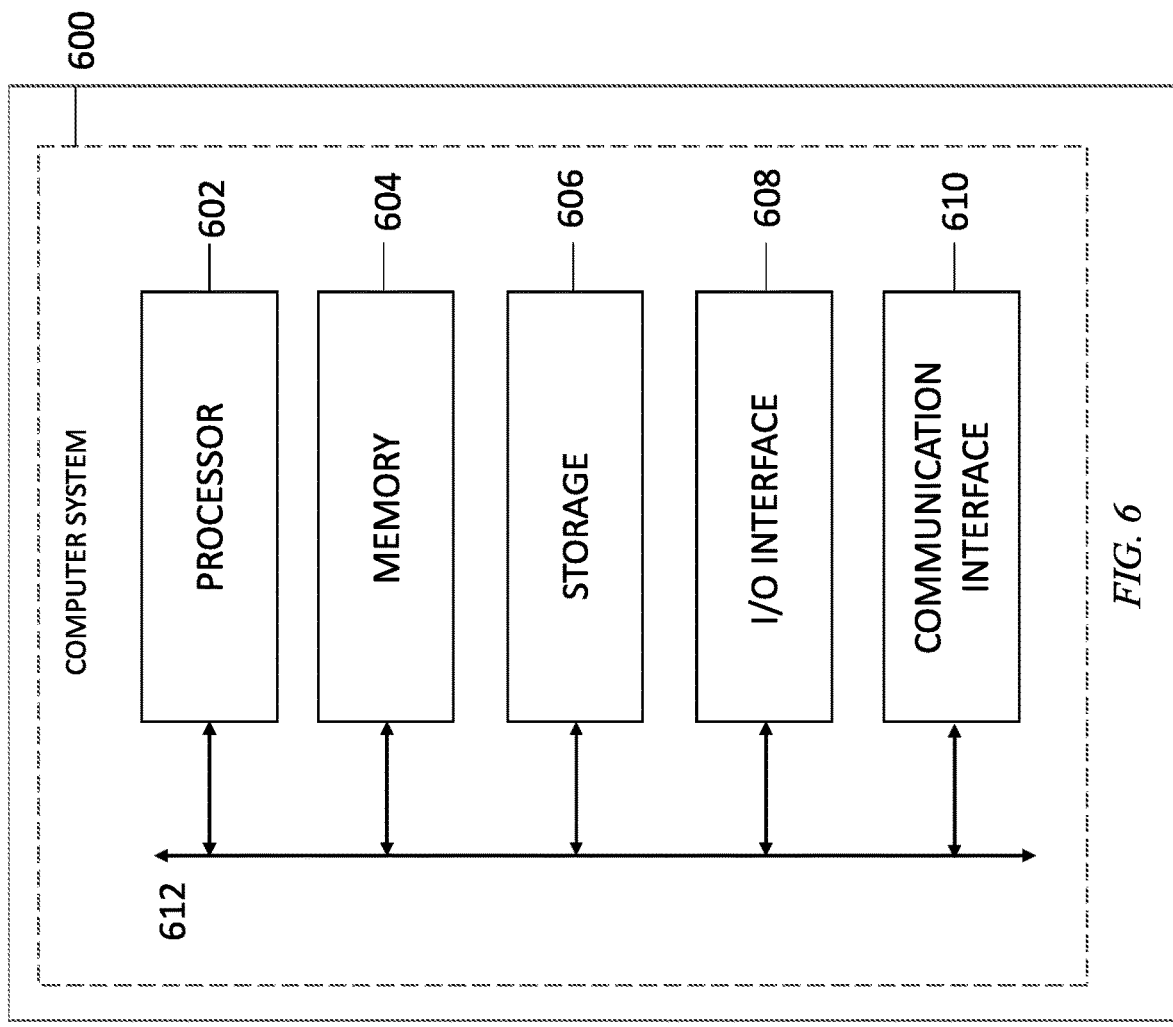
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides the functionality described or illustrated herein. Particular embodiments include one or more portions of one or more computer systems 600. Herein, a reference to a computer system may encompass a computing device, and vice versa, where appropriate. Moreover, the reference to a computer system may encompass one or more computer systems, where appropriate.

This disclosure contemplates any suitable number of computer systems 600. This disclosure contemplates computer system 600, taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real-time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up the virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor, or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (for example, another computer system 600) to memory 604. Processor 602 may then load the instructions from memory 604 to an internal register or internal cache. To execute the instructions, processor 602 may retrieve the instructions from the internal register or internal cache and decode them. During or after the execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    starting a network-coordination service, a network-interface component, and an application as separate processes within a user space of an operating system of a device;
    receiving, by the network-coordination service, a request from the application to connect with a host;
    verifying, by the network-coordination service and in response to the request, that the application has permission to connect with the host;
    selecting, by the network-coordination service and in response to the request, the network-interface component to service the request to connect with the host, wherein the network-interface component is associated with a network interface of the device;
    allocating, by the network-coordination service, a shared memory region for the application and the network-interface component, wherein the shared memory region is associated with a reference;
    sending, by the network-coordination service, the reference to the application, wherein the reference is configured to be used by the application to access the shared memory region; wherein the shared memory region is configured to be used by the application and the network-interface component to communicate packet data;
    requesting, by the network-coordination service and in response to the request, the network-interface component to provide name resolution and address resolution;
    generating, by the network-coordination service, one or more tokens associated with the name resolution and the address resolution;
    sending, by the network-coordination service, the one or more tokens to the application;
    receiving, by the network-interface component, a packet transmission request from the application specifying the one or more tokens; and
    determining, by the network-interface component, a destination address for one or more packets by validating the one or more tokens.

2. The method of claim 1, wherein the network-interface component comprises a set of per-interface services and a network-interface library, wherein the set of per-interface services includes a first service configured to perform one or more control plane networking operations, and the network-interface library is configured to perform one or more data plane networking operations.

3. The method of claim 1, wherein the application instantiates a transport protocol library associated with the operating system, the transport protocol library being configured to use the reference to the shared memory region to communicate packet data with the network-interface component.

4. The method of claim 1, wherein the application has permission to open inter-process communication (IPC) channels directly with the network-coordination service and lacks permission to open IPC channels directly with the network-interface component; and wherein the network-coordination service has permission to open IPC channels directly with the network-interface component.

5. The method of claim 1, wherein the network-coordination service is configured to manage a plurality of network-interface components, including the network-interface component.

6. The method of claim 5, further comprising:
accessing, by the network-coordination service, network configuration or network status data associated with the plurality of network-interface components; wherein the selection of the network-interface component is based on the network configuration or network status data.

7. The method of claim 1, further comprising:
receiving, by the network-interface component, the packet transmission request from the application specifying a data reference to data stored in the shared memory region;
accessing, by the network-interface component, the data stored in the shared memory region using the data reference;
generating, by the network-interface component, hardware descriptors and one or more packets for the data; and
causing, by the network-interface component, the network interface to transmit the one or more packets using the hardware descriptors.

8. The method of claim 7, further comprising:
sending, by the network-interface component, an IPC message to the application to notify the application of a status of the transmission of the one or more packets.

9. The method of claim 1, further comprising:
receiving, by the network-interface component and from the application, an address within the shared memory region for storing incoming packets;
causing, by the network-interface component, an incoming packet for the application to be stored in the shared memory region according to the address; and sending, by the network-interface component, a message to the application to notify the application that the incoming packet is available in the shared memory region.

10. A system comprising:
one or more processors; and
one or more computer-readable non-transitory storage media coupled to one or more of the processors and comprising instructions operable when executed by one or more of the processors to cause the system to:
start a network-coordination service, a network-interface component, and an application as separate processes within a user space of an operating system of a device;
receive, by the network-coordination service, a request from the application to connect with a host;
verify, by the network-coordination service and in response to the request, that the application has permission to connect with the host;
select, by the network-coordination service and in response to the request, the network-interface component to service the request to connect with the host, wherein the network-interface component is associated with a network interface of the device;
allocate, by the network-coordination service, a shared memory region for the application and the network-interface component, wherein the shared memory region is associated with a reference;
send, by the network-coordination service, the reference to the application, wherein the reference is configured to be used by the application to access the shared memory region; wherein the shared memory region is configured to be used by the application and the network-interface component to communicate packet data;

request, by the network-coordination service and in response to the request, the network-interface component to provide name resolution and address resolution;
generate, by the network-coordination service, one or more tokens associated with the name resolution and the address resolution;
send, by the network-coordination service, the one or more tokens to the application;
receive, by the network-interface component, a packet transmission request from the application specifying the one or more tokens; and
determine, by the network-interface component, a destination address for one or more packets by validating the one or more tokens.

11. The system of claim 10, wherein the application has permission to open inter-process communication (IPC) channels directly with the network-coordination service and lacks permission to open IPC channels directly with the network-interface component; and wherein the network-coordination service has permission to open IPC channels directly with the network-interface component.

12. The system of claim 10, wherein the system is further configured to:
receive, by the network-interface component, the packet transmission request from the application specifying a data reference to data stored in the shared memory region;
access, by the network-interface component, the data stored in the shared memory region using the data reference;
generate, by the network-interface component, hardware descriptors and one or more packets for the data; and
cause, by the network-interface component, the network interface to transmit the one or more packets using the hardware descriptors.

13. The system of claim 10, wherein the system is further configured to:
receive, by the network-interface component and from the application, an address within the shared memory region for storing incoming packets;
cause, by the network-interface component, an incoming packet for the application to be stored in the shared memory region according to the address; and
send, by the network-interface component, a message to the application to notify the application that the incoming packet is available in the shared memory region.

14. One or more computer-readable non-transitory storage media embodying software that is operable when executed to:
start a network-coordination service, a network-interface component, and an application as separate processes within a user space of an operating system of a device;
receive, by the network-coordination service, a request from the application to connect with a host;
verify, by the network-coordination service and in response to the request, that the application has permission to connect with the host;
select, by the network-coordination service and in response to the request, the network-interface component to service the request to connect with the host, wherein the network-interface component is associated with a network interface of the device;
allocate, by the network-coordination service, a shared memory region for the application and the network-interface component, wherein the shared memory region is associated with a reference;

send, by the network-coordination service, the reference to the application, wherein the reference is configured to be used by the application to access the shared memory region;
wherein the shared memory region is configured to be used by the application and the network-interface component to communicate packet data;
   request, by the network-coordination service and in response to the request, the network interface component to provide name resolution and address resolution;
   generate, by the network-coordination service, one or more tokens associated with the name resolution and the address resolution;
   send, by the network-coordination service, the one or more tokens to the application;
   receive, by the network-interface component, a packet transmission request from the application specifying the one or more tokens; and
   determine, by the network-interface component, a destination address for one or more packets by validating the one or more tokens.

15. The one or more computer-readable non-transitory storage media of claim 14, wherein the application has permission to open inter-process communication (IPC) channels directly with the network-coordination service and lacks permission to open IPC channels directly with the network-interface component; and wherein the network-coordination service has permission to open IPC channels directly with the network-interface component.

16. The one or more computer-readable non-transitory storage media of claim 14, wherein the one or more computer-readable non-transitory storage media is further configured to:
   receive, by the network-interface component, the packet transmission request from the application specifying a data reference to data stored in the shared memory region;
   access, by the network-interface component, the data stored in the shared memory region using the data reference;
   generate, by the network-interface component, hardware descriptors and one or more packets for the data; and
   cause, by the network-interface component, the network interface to transmit the one or more packets using the hardware descriptors.

17. The one or more computer-readable non-transitory storage media of claim 14, wherein the one or more computer-readable non-transitory storage media is further configured to:
   receive, by the network-interface component and from the application, an address within the shared memory region for storing incoming packets;
   cause, by the network-interface component, an incoming packet for the application to be stored in the shared memory region according to the address based on a token associated with the address; and
   send, by the network-interface component, a message to the application to notify the application that the incoming packet is available in the shared memory region.

* * * * *